J. Bryant,
Shears and Scissors.
N° 40,010.      Patented Sep. 22, 1863.
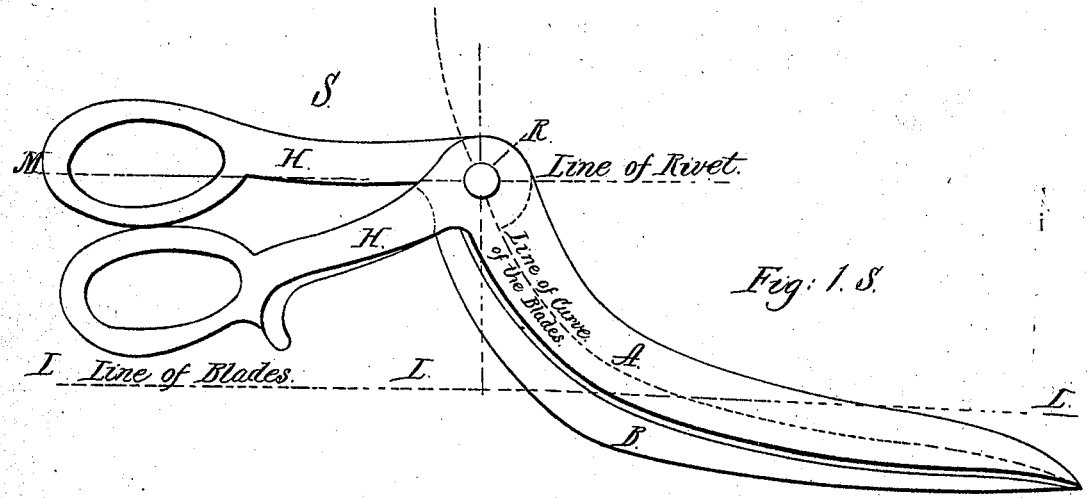
Fig. 1. S.
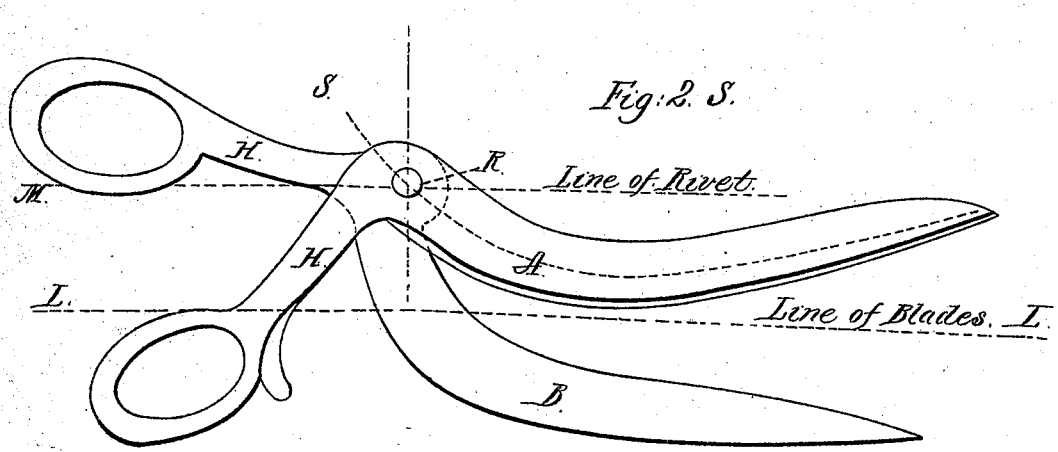
Fig. 2. S.
Witnesses:
E. Bryant
L. A. Gardiner
Inventor:
J. Bryant,

UNITED STATES PATENT OFFICE.

JOEL BRYANT, OF BROOKLYN, NEW YORK.

IMPROVEMENT IN SHEARS AND SCISSORS.

Specification forming part of Letters Patent No. 40,010, dated September 22, 1863; antedated July 29, 1863.

*To all whom it may concern:*

Be it known that I, JOEL BRYANT, of Brooklyn, in the county of Kings and State of New York, have invented a new and Improved Mode of Constructing Shears and Scissors; and I declare the following to be a full, clear, and correct description of the same—to wit:

The nature of my invention consists in constructing shears and scissors with curved blades, and in setting the rivet on a line with the curve of the said blades, so as thereby to cause the rivets of the blades of said shears and scissors to stand above the line of the blades, so as to give an increased leverage power to the said blades and an increased length to the cutting-edges of the blades, and also to give to the said blades or to the upper blade, in particular, a backward drawing motion and cut.

To enable others skilled in the art to make and use my invention, I will proceed more fully to describe the construction and operation of my improved shears and scissors, reference being made to the accompanying drawings, and to the figures and letters marked thereon, and forming a part of this specification—to wit:

Figure 1, letter S represents and shows the manner in which I construct my improved shears and scissors. This figure, Fig. 1, represents the said shears and scissors S as they appear when the blades A and B are closed together.

Fig. 2 represents the said shears and scissors S as they appear when the blades A and B are opened, as for cutting. It will be seen in this figure, Fig. 2, that when the said blades A and B are opened that the upper blade, A, is thrown forward in advance of the under blade, B, in consequence of the curve of the said blades, and the position of the rivet R, which, as aforesaid, is set on a line with the curve of the said blades A and B, and thus necessarily causing the said rivets R, as shown in Figs. 1 and 2, to stand above the line L of the said blades. The line of the said blades A and B is shown by the dotted line L, and the line of the rivet R, running parallel therewith, is shown by the line M, passing through the head of the said rivets R.

I construct my improved shears and scissors S of any desirable size, suitable for the purposes for which they are required, for cutting cloth, metals, or other substances, and I make my said shears and scissors S with curved blades A and B, substantially as shown in Figs. 1 and 2, and I set the rivets R of my said shears and scissors S on a line, M, with the curve of the said blades A and B, substantially as shown in Figs. 1 and 2. The line M of the rivets R thus set, running parallel with the line L of the blades, (not following the curve of the blades,) shows that the said rivets R, while set on the line of the curve as it extends backward and upward, causes the said rivets R to stand considerably above the line L of the blades A and B, as aforesaid, the line L of the blades running straight in the direction of the blades, but not following the curve, as aforesaid; and the line M of the rivet R, here spoken of, is not the line of the curve on which the said rivet R is set, but a line, M, drawn horizontally through the center and head of the rivet R and running parallel with the line L of the blades A and B, following the direction of the blades, but not the direction of the curve of the blades, as aforesaid. The handles H of my improved shears and scissors S are made substantially as shown.

When my improved shears and scissors S are thus constructed with curved blades A and B, and their rivets R set on a line with the curve of the said blades, then it is obvious that the rivets R, which form the fulcrums of the blades, will stand above the line L of the blades A and B, as aforesaid, and give an increase of leverage to the handles and blades and cause them (without slots or any other device whatever) to have or give a more backward drawing cut than other shears and scisors, while at the same time the length of the cutting-edges of the blades are considerably increased by the curve of the said blades. In short, it may be said that all of the aforesaid advantages are derived directly or indirectly by curving the blades A and B of my improved shears and scissors S, Figs. 1 and 2, as by the curve of the said blades the rivets R are necessarily made to stand above the line L of the said blades, as aforesaid; and thus, substantially as aforesaid, I construct and use my improved shears and scissors S, Figs. 1 and 2.

I am aware that shears and scissors have been made with crooked blades and with crooked handles and with curved edges; but I am not aware that shears or scissors S of any description have ever been made with curved blades, so that by setting the rivets R on a line with the curve of the said blades A and B the said rivets R will, in all cases, stand above the line L of the direction of the said blades A and B, and by which they may be known and distinguished from all others.

I do not claim the construction of shears and scissors with their rivets R set above or below the line of the blades A and B, unless the blades of said shears or scissors S are curved, as herein described; nor do I claim the construction of crooked or curved bladed shears and scissors unless their rivets R are set on a line with the curve of the blades and above the line L of their direction, as herein described.

What I do claim as my invention, and desire to secure by Letters Patent of the United States, is as follows—to wit:

The construction and exclusive use of shears and scissors S, Figs. 1 and 2, when made with curved blades A and B, and with their rivets R set on a line with the curve of the said blades A and B, substantially as herein described, and for the purposes herein set forth.

JOEL BRYANT.

Witnesses:
CHARLES LEECH,
E. BRYANT.